US010551256B2

(12) United States Patent
Arimura et al.

(10) Patent No.: US 10,551,256 B2
(45) Date of Patent: Feb. 4, 2020

(54) MAGNETOSTRICTIVE TORQUE SENSOR AND METHOD OF MANUFACTURING SAME

(71) Applicant: HONDA MOTOR CO., LTD., Tokyo (JP)

(72) Inventors: Yutaka Arimura, Saitama (JP); Yosuke Tanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 15/710,958

(22) Filed: Sep. 21, 2017

(65) Prior Publication Data

US 2018/0087982 A1    Mar. 29, 2018

(30) Foreign Application Priority Data

Sep. 23, 2016  (JP) .................................. 2016-185235

(51) Int. Cl.
*G01L 3/10*  (2006.01)
*B62D 5/04*  (2006.01)
(Continued)

(52) U.S. Cl.
CPC ............ *G01L 3/102* (2013.01); *B62D 5/0481* (2013.01); *C25D 5/36* (2013.01); *C25D 7/00* (2013.01);
(Continued)

(58) Field of Classification Search
CPC ......... G01L 3/102; B62D 5/0481; B62D 3/12; B62D 5/0421; B62D 5/0454; C25D 5/36; C25D 7/00; C25D 7/04
(Continued)

(56) References Cited

U.S. PATENT DOCUMENTS 4,896,544 A *  1/1990  Garshelis ................ G01L 3/102
                                                    73/862.333
5,205,145 A    4/1993  Ishino et al.
(Continued)

FOREIGN PATENT DOCUMENTS

JP    H03-110432 A    5/1991
JP    H04-359127 A    12/1992
(Continued)

OTHER PUBLICATIONS

Japanese Office Action with English Translation dated Sep. 3, 2019, 6 pages.

*Primary Examiner* — Jacob D Knutson
(74) *Attorney, Agent, or Firm* — Rankin, Hill & Clark LLP

(57) ABSTRACT

A magnetostrictive torque sensor is provided that is capable of maintaining high detection accuracy, even when an excessive torque acts on a rotary shaft. The magnetostrictive torque sensor includes a magnetostrictive film 71 that is arranged on a second steering shaft 23, or a rotary shaft, having a substantially columnar shape so as to surround the second steering shaft 23 around its axis, and detects a rotational torque about the axis acting on the second steering shaft 23 based on a change in a magnetic property of the magnetostrictive film 71. Compressive stress remains on an outer circumferential surface of a sensor region 77 of the second steering shaft 23 around which the magnetostrictive film 71 is arranged. A plated layer of the magnetostrictive film 71 is arranged on the outer circumferential surface of the sensor region 77 in which compressive stress remains.

20 Claims, 6 Drawing Sheets

(51) Int. Cl.
  *C25D 5/36* (2006.01)
  *C25D 7/00* (2006.01)
  *B62D 3/12* (2006.01)
(52) U.S. Cl.
  CPC .............. *B62D 3/12* (2013.01); *B62D 5/0421* (2013.01); *B62D 5/0454* (2013.01)
(58) Field of Classification Search
  USPC .................................... 180/443, 444, 446
  See application file for complete search history.

(56) References Cited

U.S. PATENT DOCUMENTS

| | | | | |
|---|---|---|---|---|
| 5,449,418 | A * | 9/1995 | Takagi | G01B 7/24 |
| | | | | 148/304 |
| 6,595,074 | B2 * | 7/2003 | Shimizu | B62D 5/0406 |
| | | | | 180/443 |
| 7,506,554 | B2 * | 3/2009 | Shimizu | G01L 3/102 |
| | | | | 73/862.331 |
| 7,584,673 | B2 * | 9/2009 | Shimizu | G01L 3/102 |
| | | | | 73/862.333 |
| 7,735,382 | B2 * | 6/2010 | Shimizu | G01L 3/102 |
| | | | | 73/862.333 |
| 7,752,923 | B2 * | 7/2010 | Shimizu | G01L 3/103 |
| | | | | 73/862.325 |
| 7,762,148 | B2 * | 7/2010 | Shimizu | B62D 6/10 |
| | | | | 73/862.331 |
| 8,011,256 | B2 * | 9/2011 | Yoneda | G01L 3/102 |
| | | | | 29/595 |
| 8,807,260 | B2 * | 8/2014 | Shimizu | G01L 3/102 |
| | | | | 180/220 |
| 10,184,847 | B2 * | 1/2019 | Ishikawa | B62M 6/50 |
| 2012/0273293 | A1 * | 11/2012 | Oniwa | B62D 5/0463 |
| | | | | 180/446 |

FOREIGN PATENT DOCUMENTS

| | | |
|---|---|---|
| JP | 2003-344186 A | 12/2003 |
| JP | 2004-239652 | 8/2004 |
| JP | 2008/224678 A | 9/2008 |
| JP | 2009-92671 A | 4/2009 |

* cited by examiner

MAGNETOSTRICTIVE TORQUE SENSOR AND METHOD OF MANUFACTURING SAME

CROSS-REFERENCE TO RELATED APPLICATION

This application claims the benefit of priority to Japanese Patent Application No. 2016-185235 filed 23 Sep. 2016, the disclosures of all of which are hereby incorporated by reference in their entireties.

TECHNICAL FIELD

The present invention relates to a magnetostrictive torque sensor for contactlessly detecting a rotational torque about an axis acting on a rotary shaft, and a method of manufacturing the magnetostrictive torque sensor.

BACKGROUND ART

The Applicant of the present invention discloses a magnetostrictive torque sensor that contactlessly detects a rotational torque about an axis acting on a rotary shaft, for example, in Japanese Patent Application Publication No. 2004-239652. The magnetostrictive torque sensor according to Japanese Patent Application Publication No. 2004-239652 has its rotary shaft formed of a chromium molybdenum steel material (hereinafter abbreviated as "SCM material" in some cases). A magnetostrictive film is attached in advance to a rotary shaft made of an SCM material, and then heat treatment such as carburizing treatment is applied to the SCM material to set the Rockwell hardness of the rotary shaft within a range of 40 to 65 HRC.

The magnetostrictive torque sensor according to Japanese Patent Application Publication No. 2004-239652 takes an approach of increasing the hardness of the rotary shaft for suppressing the rotary shaft from having large plastic deformation or the magnetostrictive film from being peeled off, even when an excessive torque acts on the rotary shaft, to suitably keep the detection accuracy.

SUMMARY OF THE INVENTION

Problems to be Solved

The present invention is intended to provide a magnetostrictive torque sensor that is capable of maintaining high detection accuracy through an approach different from the approach of increasing the hardness of the rotary shaft according to Japanese Patent Application Publication No. 2004-239652, even when an excessive torque acts on the rotary shaft, and to provide a method of manufacturing the magnetostrictive torque sensor.

Solution to Problems

In order to achieve the above objective, a magnetostrictive torque sensor according to one aspect of the present invention includes a magnetostrictive film that is arranged on a rotary shaft having a substantially columnar shape so as to surround the rotary shaft around its axis, for detecting a rotational torque about the axis acting on the rotary shaft based on a change in a magnetic property of the magnetostrictive film. Compressive stress remains on an outer circumferential surface of a region of the rotary shaft around which the magnetostrictive film is arranged. A plated layer of the magnetostrictive film is arranged on the outer circumferential surface of the region in which compressive stress remains.

As the plated layer of the magnetostrictive film is arranged on the outer circumferential surface of the region of the rotary shaft in which compressive stress remains, the magnetostrictive torque sensor of one aspect of the present invention allows the outer circumferential surface of the rotary shaft to have increased tolerance of plastic deformation. In addition, as the plastic deformation of the outer circumferential surface of the rotary shaft, on which the plated layer of the magnetostrictive film is arranged, is reduced, stress inputted to the magnetostrictive film in a biased orientation due to the plastic deformation is reduced. As a result, high detection accuracy is maintained through the approach different from the approach of increasing the hardness of the rotary shaft, even when an excessive torque acts on the rotary shaft.

Additionally, a method of manufacturing a magnetostrictive torque sensor according to another aspect of the present invention assumes a magnetostrictive torque sensor which includes a magnetostrictive film that is arranged on the rotary shaft having a substantially columnar shape so as to surround the rotary shaft around its axis, for detecting a rotational torque about the axis acting on the rotary shaft based on a change in a magnetic property of the magnetostrictive film. The method of manufacturing a magnetostrictive torque sensor according to the second aspect of the present invention includes a step of using a plating current density set in a range of 50 to 60 A/dm^2 to form a plated layer of the magnetostrictive film.

As the plating current density set in the range of 50 to 60 A/dm^2 is used for the purpose of optimizing the crystallite diameter of the plated layer to form the plated layer of the magnetostrictive film, the method of manufacturing a magnetostrictive torque sensor according to another aspect of the present invention allows the magnetostrictive film to have a reasonably small crystallite diameter. Accordingly, the magnetic moment of each crystallite is small. Then, a magnetic orientation is more easily changed with respect to the inputted rotational torque (less influenced by residual properties due to the previous input). That is, the magnetostrictive torque sensor has its inevitable hysteresis reduced. As a result, high detection accuracy is maintained through an approach different from the approach of increasing the hardness of the rotary shaft, even when an excessive torque acts on the rotary shaft.

Advantageous Effects of the Invention

The magnetostrictive torque sensor and the method of manufacturing the magnetostrictive torque sensor according to the present invention allow for maintaining high detection accuracy through an approach different from the approach of increasing the hardness of the rotary shaft, even when an excessive torque acts on the rotary shaft.

DETAILED DESCRIPTION OF EMBODIMENTS

Figure 1:
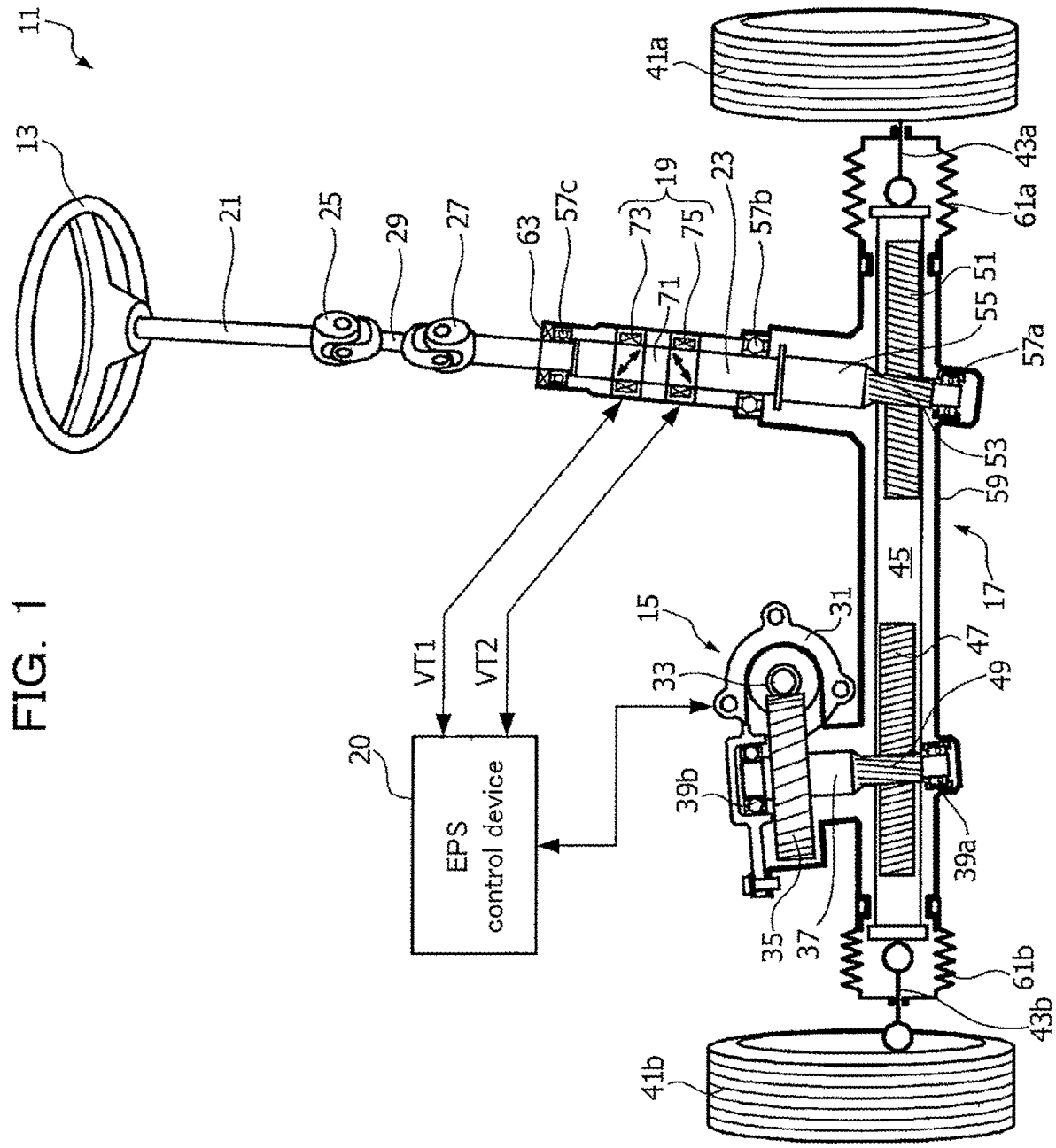
FIG. 1 is a schematic diagram of an electric power steering apparatus according to an embodiment of the present invention.

Hereinafter, a description will be given in detail of a magnetostrictive torque sensor and a method of manufacturing the magnetostrictive torque sensor according to an embodiment of the present invention, with reference to the drawings. Note that in the drawings to be referenced below, the size and shape of each member may be deformed or exaggerated to schematically represent them for convenience of illustration.

Overview of Electric Power Steering Apparatus

Figure 2:
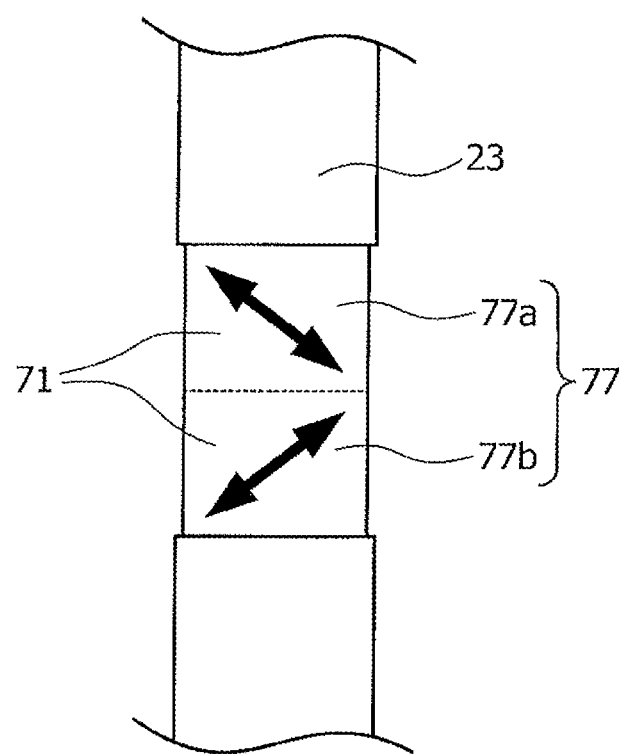
FIG. 2 is a diagram showing a sensor region arranged on a second steering shaft as a rotary shaft.

First, a description will be given of the outline of an electric power steering apparatus 11 including a magnetostrictive torque sensor according to an embodiment of the present invention, with reference to FIGS. 1 and 2. FIG. 1 is a schematic diagram of the electric power steering apparatus 11 according to the embodiment of the present invention. FIG. 2 is a diagram showing a sensor region arranged on a second steering shaft as a rotary shaft.

As shown in FIG. 1, the electric power steering (sometimes abbreviated as "EPS" below) apparatus 11 according to the embodiment of the present invention includes a steering wheel 13, a steering assist force generating device 15, a steering device 17, a steering torque sensor 19, and an EPS control device 20.

The steering wheel 13 is operated when the traveling direction of a vehicle (not shown) is changed to a desired direction. The steering wheel 13 in an annular shape has, in the center, a first steering shaft 21 connected thereto, which is made of solid columnar steel and connected in series with a second steering shaft 23, which is also made of solid columnar steel. The first steering shaft 21 has, on the lower end, a first universal joint 25 and a second universal joint 27 connected thereto via a link member 29 in between. The steering wheel 13 corresponds to a "steering member" of the present invention.

The steering assist force generating device 15 has a function of generating an assisting force for a driver steering the steering wheel 13. The rack-assist steering assist force generating device 15 includes: an auxiliary motor 31 that gives an assisting force for reducing a force required for the driver steering the steering wheel 13; and a worm wheel gear 35 that meshes with a worm gear 33 arranged on the output shaft of the auxiliary motor 31. The worm wheel gear 35 is arranged on a first pinion shaft 37 so as to rotate about the first pinion shaft 37. The first pinion shaft 37 is rotatably supported at both ends in its axial direction via bearings 39a, 39b, respectively.

The auxiliary motor 31 may employ, for example, a three-phase brushless motor having a stator (not shown) including field coils and a rotor (not shown) rotating inside the stator. However, a DC brush motor may be used as the auxiliary motor 31.

The steering device 17 has a function of transmitting the force due to the driver steering the steering wheel 13 to a pair of steered wheels 41a, 41b arranged in the vehicle width direction. More specifically, the steering device 17 includes: a rack shaft 45 that is connected to a pair of the steered wheels 41a, 41b via tie rods 43a, 43b; a first pinion gear 49 that meshes with a first rack teeth 47 arranged on the rack shaft 45; the first pinion shaft 37 that has the first pinion gear 49 arranged near one end thereof in its axial direction; a second pinion gear 53 that meshes with a second rack teeth 51 arranged on the rack shaft 45; and a second pinion shaft 55 that has the second pinion gear 53 arranged near one end thereof in its axial direction.

The second pinion shaft 55 has the second steering shaft 23 arranged at the other end thereof in its axial direction. The second steering shaft 23 has its lower, intermediate, and upper portions rotatably supported via bearings 57a, 57b, and 57c, respectively.

The components and the like of the steering system 17 are housed in a housing 59. Openings of the housing 59 are liquid-tightly held by a combination of dust seals 61a, 61b and an oil seal 63.

As shown in FIG. 1, the steering torque sensor 19 is arranged on the second steering shaft 23. The magnetostrictive steering torque sensor 19 has a function of contactlessly detecting the magnitude and orientation of the steering torque inputted from the steering wheel 13. The steering torque sensor 19 corresponds to the "magnetostrictive torque sensor" of the present invention.

As shown in FIG. 1, the steering torque sensor 19 includes the second steering shaft 23, a magnetostrictive film 71 that is arranged so as to cover the outer circumferential surface of the second steering shaft 23, and first and second detection coils 73, 75 that are respectively arranged axially on both sides of the magnetostrictive film 71.

The magnetostrictive film 71 is formed on a sensor region 77 (see FIG. 2) of the second steering shaft 23 with a material such as Fe—Ni (Fe—Co alloy, SmFe alloy, or the like may also be used) so as to have a film thickness in the range of 5 to 100 μm. A well-known electrolytic plating method is used to form the magnetostrictive film 71. Note that the outer circumferential surface of the sensor region 77 of the second steering shaft 23 is recessed in FIG. 2 as compared to that of other regions, because a polishing process has been executed on the outer circumferential surface of the sensor region 77. This will be described in detail later.

The magnetostrictive film 71 has different magnetic anisotropies imparted between regions 77a, 77b (see FIG. 2) which axially face the first and second detection coils 73 and 75, respectively. An alternating current for detecting a change in the steering torque flows through the first and second detection coils 73, 75.

When the steering torque acts on the second steering shaft 23, a magnetic property (magnetic permeability) changes in each of the regions 77a, 77b of the magnetostrictive film 71. Then, steering torque signals VT1, VT2, which are respectively associated with the changes in the magnetic property (magnetic permeability) in the regions 77a, 77b of the magnetostrictive film 71, are outputted from the first and second detection coils 73, 75, respectively. In response to this, the EPS control device 20 calculates the steering torque value based on the difference between the steering torque signals VT1, VT2. The steering torque value calculated in this manner is used by the EPS control device 20 to control driving of the auxiliary motor 31.

Manufacturing Method of Magnetostrictive Torque Sensor

Figure 3:
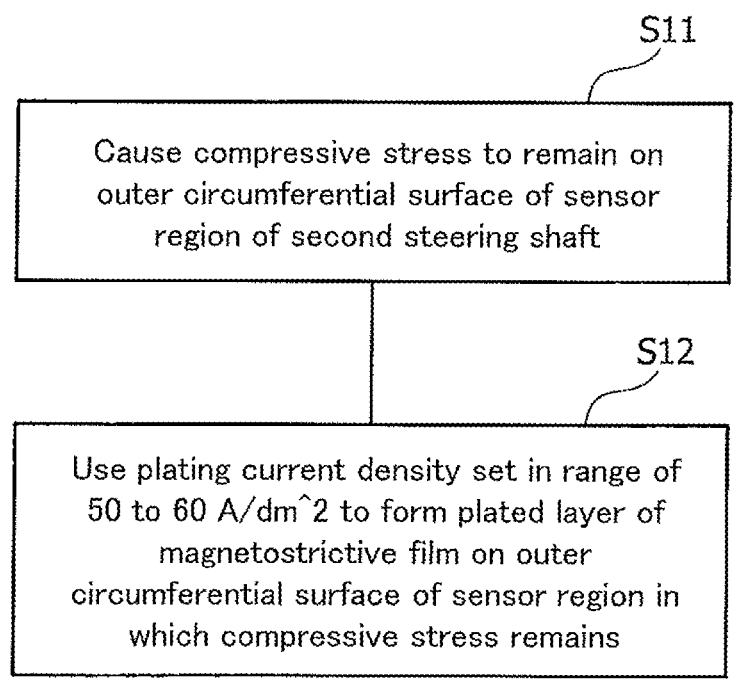
FIG. 3 is a process chart of a method of manufacturing the magnetostrictive torque sensor according to the embodiment of the present invention.
Figure 4A:
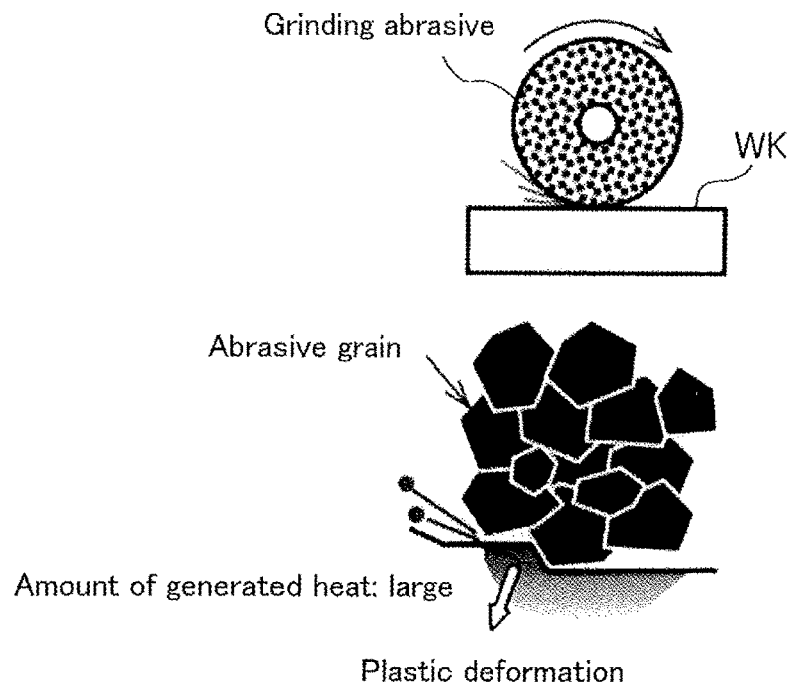
FIG. 4A is a diagram conceptually showing an amount of generated heat and an amount of plastic deformation when a workpiece is ground.
Figure 4B:
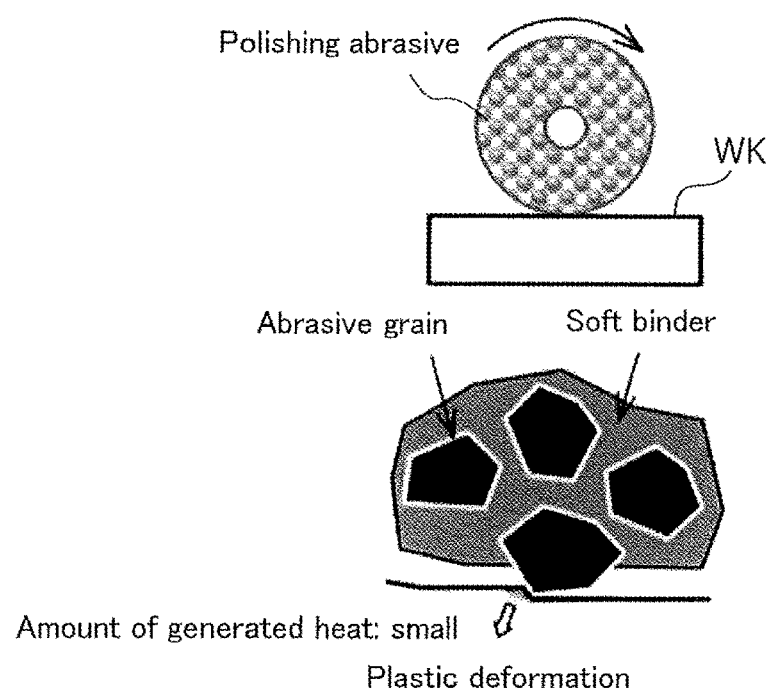
FIG. 4B is a diagram conceptually showing an amount of generated heat and a plastic deformation amount when a workpiece is polished.
Figure 5A:
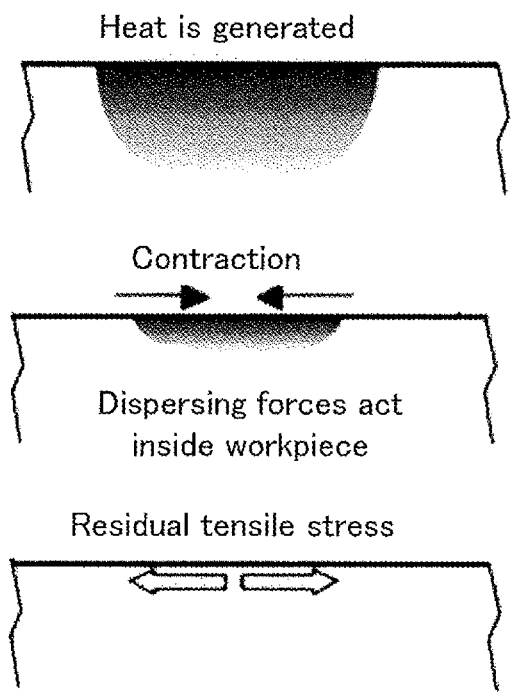
FIG. 5A is a diagram conceptually showing the influence of heat generated in the workpiece on residual stress.
Figure 5B:
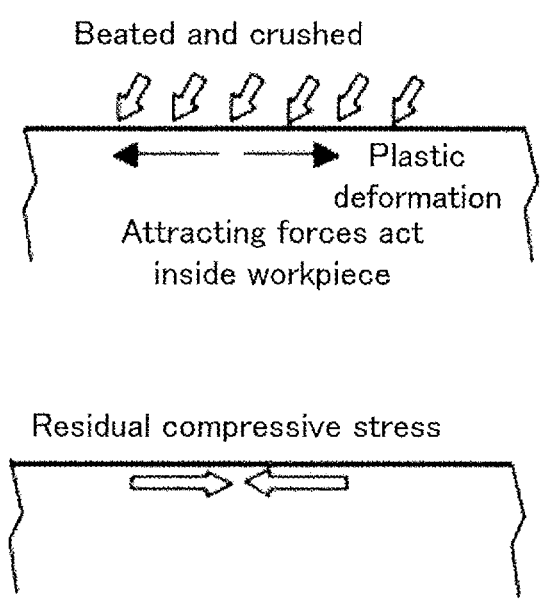
FIG. 5B is a diagram conceptually showing the influence of plastic deformation of the workpiece on residual stress.
Figure 6:
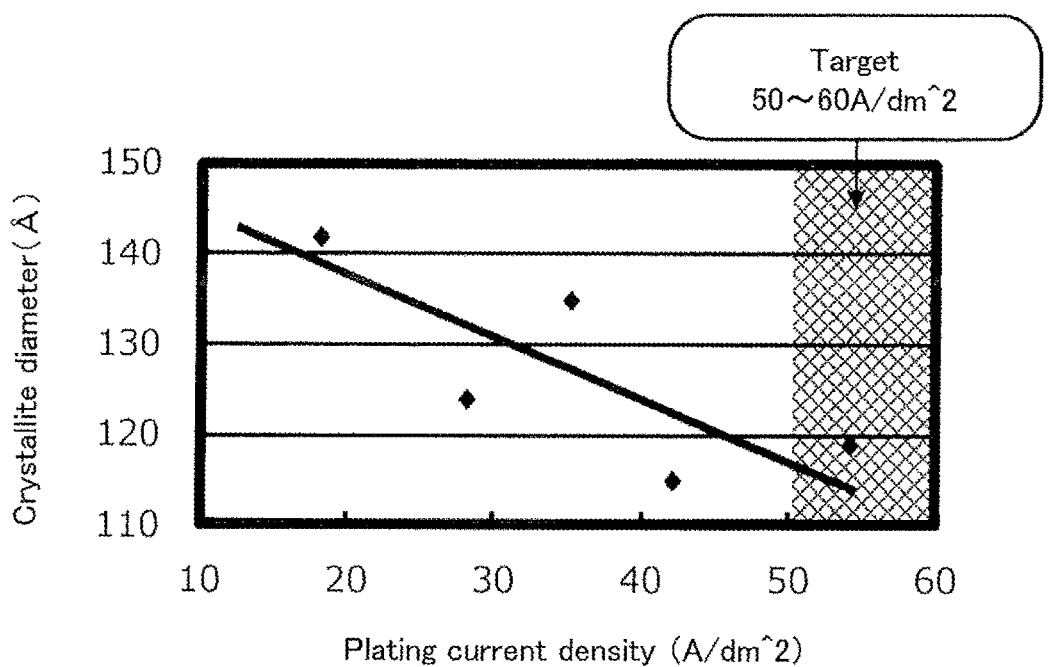
FIG. 6 is a chart showing the relationship of the crystallite diameter of the plated film to the plating current density.
Figure 7:
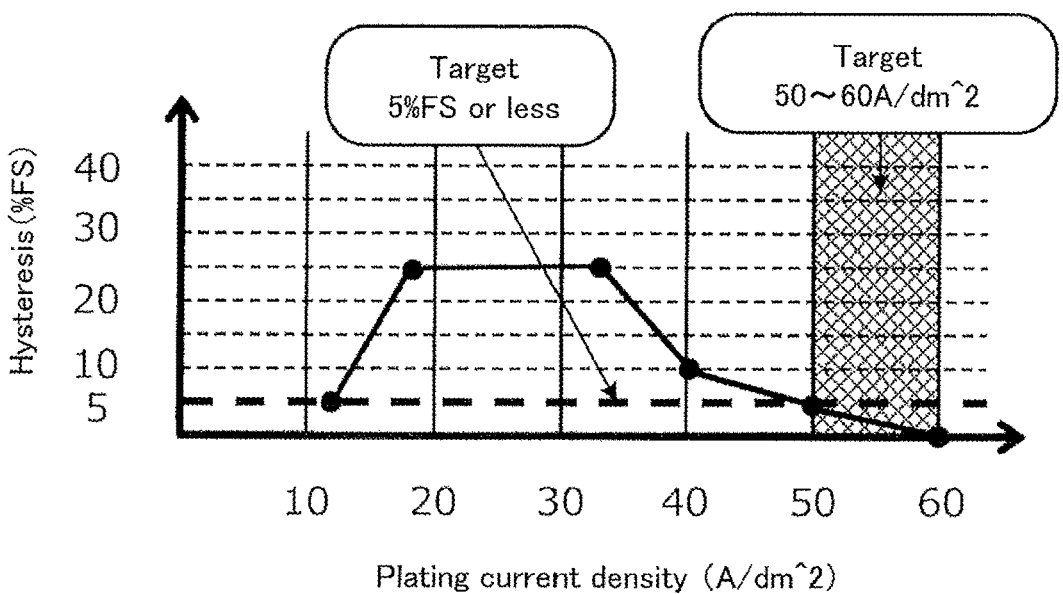
FIG. 7 is a chart showing the relationship of hysteresis to the plating current density.

Next, a description will be given of a method of manufacturing the magnetostrictive torque sensor according to the embodiment of the present invention, with reference to FIGS. 3, 4A, 4B, 5A, 5B, 6, and 7 as appropriate. FIG. 3 is a process chart of a method of manufacturing the magnetostrictive torque sensor according to the embodiment of the present invention. FIG. 4A is a diagram conceptually showing an amount of generated heat and an amount of plastic deformation when a workpiece is ground. FIG. 4B is a diagram conceptually showing the amount of generated heat and the amount of plastic deformation when the workpiece is polished. FIG. 5A is a diagram conceptually showing the influence of heat generated in the workpiece on residual stress. FIG. 5B is a diagram conceptually showing the influence of plastic deformation of the workpiece on residual stress. FIG. 6 is a chart showing the relationship of the crystallite diameter of the plated film to the plating current density. FIG. 7 is a chart showing the relationship of hysteresis to the plating current density.

The method of manufacturing the magnetostrictive torque sensor according to the embodiment of the present invention causes compressive stress to remain on the outer circumferential surface of the sensor region 77 (see FIG. 2) of the second steering shaft (rotary shaft) 23, on which the magnetostrictive film 71 is arranged, in step S11 in FIG. 3. The step of causing compressive stress to remain on the outer circumferential surface of the sensor region 77 is achieved by polishing the outer circumferential surface of the sensor region 77.

Here, the grinding abrasive used for grinding a workpiece WK has its abrasive grains bound densely and hard, as shown in FIG. 4A.

In contrast, the polishing abrasive used for polishing the workpiece WK has its abrasive grains bonded with a soft binder, as shown in FIG. 4B. Paper, cloth, sponge material, brush material or the like is used as the binder of the polishing abrasive.

It is assumed that both of the grinding and polishing include a combination of the abrasive grains beating and crushing the surface of the workpiece WK, and the abrasive grains rubbing off the surface of the workpiece WK along with rotational movement of the grinding or polishing abrasive. These proceedings cause the surface of the workpiece WK to be plastically deformed and to have heat generated thereon.

Here, when the workpiece WK is ground, the surface of the workpiece WK is rubbed off while the pressing force of the hard abrasive grains of the grinding abrasive is held. Therefore, the amount of generated heat and the amount of plastic deformation are both large. In addition, grinding and cutting are common in that the surface of the workpiece WK is rubbed off while the pressing force of the hard abrasive grains is held. For this reason, it is assumed that the amount of generated heat and the amount of plastic deformation are both large in the cutting process as in the grinding process.

In contrast, when the workpiece WK is polished, the amount of generated heat and the amount of plastic deformation are both smaller than the case where the workpiece WK is ground.

If the amount of generated heat is large (as in the case of grinding the workpiece WK), the surface of the workpiece WK is going to contract as it is cooled, as shown in FIG. 5A. Then, dispersing forces act on material molecules inside the workpiece WK to generate a residual tensile stress on the surface of the workpiece WK.

In contrast, if the workpiece WK is plastically deformed, the surface of the workpiece WK is going to be elongated, as shown in FIG. 5B. Then, attracting forces act on the material molecules inside the workpiece WK to generate a residual compressive stress on the surface of the workpiece WK.

In general, the surface of the workpiece WK has residual tensile stress dominantly generated thereon when it is ground. On the contrary, the surface of the workpiece WK has residual compressive stress dominantly generated thereon when it is polished, as described above. It is assumed that this is because the influence of plastic deformation due to beating and crushing the surface of the workpiece WK is larger than that of generated heat so that the residual stress on the surface of the workpiece WK turns to compressive stress.

Next, in step S12 in FIG. 3, the plating current density set in the range of 50 to 60 A/dm$^2$ is used by electrolytic plating method, for the purpose of optimizing the crystallite diameter of a plated layer, to form a plated layer of the magnetostrictive film 71 on the outer circumferential surface of the sensor region 77 in which compressive stress remains.

Using the plating current density set in the range of 50 to 60 A/dm$^2$ allows the crystallite diameter of the plated layer to be optimized so as to be less than about 120 Å, as shown in FIG. 6.

In addition, using the plating current density set in the range of 50 to 60 A/dm$^2$ also promises an advantageous effect of reducing the hysteresis to 5 [% F.S.] or less, as shown in FIG. 7.

Operational Effects of Magnetostrictive Torque Sensor, Electric Power Steering Apparatus 11, and Method of Manufacturing Magnetostrictive Torque Sensor The magnetostrictive torque sensor according to the first aspect of the present invention includes the magnetostrictive film 71 that is arranged on the second steering shaft (rotary shaft) 23 having a substantially columnar shape so as to surround the second steering shaft 23 around its axis, for detecting a rotational torque about the axis acting on the second steering shaft 23 based on a change in a magnetic property of the magnetostrictive film 71. Compressive stress remains on the outer circumferential surface of the sensor region 77 of the second steering shaft 23 around which the magnetostrictive film 71 is arranged. A plated layer of the magnetostrictive film 71 is arranged on the outer circumferential surface of the sensor region 77 in which compressive stress remains.

As the plated layer of the magnetostrictive film 71 is provided on the outer circumferential surface of the sensor region 77 of the second steering shaft 23 in which compressive stress remains, the magnetostrictive torque sensor of the first aspect of the present invention allows the outer circumferential surface of the steering shaft 23 to have increased tolerance of plastic deformation. In addition, as the plastic deformation of the outer circumferential surface of the second steering shaft 23, on which the plated layer of the magnetostrictive film 71 is arranged, is reduced, stress inputted to the magnetostrictive film 71 in the biased orientation due to the plastic deformation is reduced. As a result, high detection accuracy is maintained through the approach different from the approach of increasing the hardness of the second steering shaft 23, even when an excessive torque acts on the second steering shaft 23.

In addition, an electric power steering apparatus according to a second aspect of the present invention includes: the steering torque sensor 19 that detects a steering torque of the steering wheel (steering member) 13 of a vehicle acting on the second steering shaft 23; and the auxiliary motor 31 that generates an auxiliary torque corresponding to the steering torque detected by the steering torque sensor 19, wherein the electric power steering apparatus 11 uses the magnetostrictive torque sensor according to the first aspect of the present invention, as the steering torque sensor 19, to control driving of the auxiliary motor 31.

The electric power steering apparatus 11 according to the second aspect of the present invention improves detection accuracy of the steering torque sensor 19, to suitably control the magnitude of the assist force for the steering corresponding to the steering torque.

Further, the method of manufacturing a magnetostrictive torque sensor according to the third aspect of the present invention assumes a magnetostrictive torque sensor, wherein the sensor includes the magnetostrictive film 71 that is arranged on the second steering shaft (rotary shaft) 23 having a substantially columnar shape so as to surround the second steering shaft 23 around its axis, for detecting a rotational torque about the axis acting on the second steering shaft 23 based on a change in a magnetic property of the magnetostrictive film 71. The method includes a step of using a plating current density set in the range of 50 to 60 A/dm$^2$ to form a plated layer of the magnetostrictive film 71.

The method of manufacturing a magnetostrictive torque sensor according to the third aspect of the present invention uses the plating current density set in the range of 50 to 60 A/dm$^2$ for the purpose of optimizing the crystallite diameter of the plated layer to form the plated layer of the magnetostrictive film 71 in a short time (at high speed), so that the magnetostrictive film 71 has a reasonably small crystallite diameter. Accordingly, the magnetic moment of each crystallite is small. Then, a magnetic orientation is more easily changed with respect to the inputted rotational torque (less influence by residual properties due to the previous input). That is, the magnetostrictive torque sensor has its inevitable hysteresis reduced. As a result, high detection accuracy is maintained through an approach different from the approach of increasing the hardness of the second steering shaft (rotary shaft) 23, even when an excessive torque acts on the second steering shaft 23.

Furthermore, a method of manufacturing a magnetostrictive torque sensor according to a fourth aspect of the present invention assumes a magnetostrictive torque sensor, wherein the sensor includes the magnetostrictive film 71 that is arranged on the second steering shaft (rotary shaft) 23 having a substantially columnar shape so as to surround the second steering shaft 23 around its axis, for detecting a rotational torque about the axis acting on the second steering shaft 23 based on a change in a magnetic property of the magnetostrictive film 71. The method includes: a step of causing compressive stress to remain on the outer circumferential surface of the sensor region 77 of the second steering shaft 23, on which the magnetostrictive film 71 is arranged; and a step of using the plating current density set in the range of 50 to 60 A/dm$^2$ to form a plated layer of the magnetostrictive film 71 on the outer circumferential surface of the sensor region 77 in which the compressive stress remains.

The step of causing compressive stress to remain on the outer circumferential surface of the sensor region 77 of the second steering shaft 23, on which the magnetostrictive film 71 is arranged, may be achieved by polishing the outer circumferential surface of the sensor region 77, for example. Including such a process allows for preventing minute cracks and plastic deformation of the surface of the base material, even when an excessive rotational torque is inputted. Additionally, a tolerable input torque value is increased. As a result, hysteresis as a torque sensor is reduced.

The method of manufacturing a magnetostrictive torque sensor according to the fourth aspect of the present invention uses the plating current density set in the range of 50 to 60 A/dm$^2$ for the purpose of optimizing the crystallite diameter of the plated layer to form the plated layer of the magnetostrictive film 71 on the outer circumferential surface of the sensor region 77, on which the compressive stress remains, in a short time (at high speed), so that the magnetostrictive film 71 has a reasonably small crystallite diameter. Accordingly, the magnetic moment of each crystallite is small. Then, a magnetic orientation is more easily changed with respect to the inputted rotational torque (less influence by residual properties due to the previous input). That is, the magnetostrictive torque sensor has its inevitable hysteresis reduced. As a result, high detection accuracy is maintained through an approach different from the approach of increasing the hardness of the second steering shaft (rotary shaft) 23, even when an excessive torque acts on the second steering shaft 23.

Moreover, a method of manufacturing a magnetostrictive torque sensor according to a fifth aspect of the present invention is the method of manufacturing a magnetostrictive torque sensor according to the third or fourth aspect of the present invention, wherein the second steering shaft (rotary shaft) 23 may have the Rockwell hardness of 40 HRC or less.

Also, a method of manufacturing a magnetostrictive torque sensor according to a sixth aspect of the present invention is the method of manufacturing a magnetostrictive torque sensor according to any one of the third to fifth aspects of the present invention, wherein the second steering shaft (rotary shaft) 23 may be made of a carbon steel material for machine structural use (sometimes abbreviated as "S—C material" hereinbelow).

The magnetostrictive torque sensor according to Japanese Patent Application Publication No. 2004-239652 has a potential problem caused by the heat treatment (carburizing treatment) to be applied to the SCM material for increasing the surface hardness of the rotary shaft. That is, the heat treatment (carburizing treatment) to be applied to the SCM material is executed for a predetermined operating time in a state that several hundreds of workpieces are placed in the carburizing treatment furnace. However, the temperature in the carburizing treatment furnace is not uniform at all places, and there is a certain degree of variation. The variation in temperature between places in the carburizing furnace causes variation in quality of the surface hardness of the semifinished product (rotary shaft). As a result, the semifinished product (rotary shaft) has suffered a problem of poor yield. Also, the SCM material is expensive as a workpiece, and reduction in manufacturing cost has been required. Besides, the predetermined operating time required for the heat treatment (carburization treatment) is relatively long, and reduction in the number of manufacturing steps has been required.

According to the method of manufacturing a magnetostrictive torque sensor according to the fifth aspect of the invention, the second steering shaft 23 has the Rockwell hardness of 40 HRC or less to allow for adopting an S—C material as a workpiece so that the manufacturing cost is significantly reduced, because an S—C material is an inexpensive general-purpose material.

Also, according to the method of manufacturing a magnetostrictive torque sensor according to the sixth aspect of the invention, the second steering shaft 23 is made of an S—C material to allow for adopting an S—C material as a workpiece so that the manufacturing cost is significantly reduced, because an S—C material is an inexpensive general-purpose material. The S—C material is not particularly limited, but S45C, S50C, or the like may be suitably adopted, for example.

This is achieved by synergistic action of polishing the outer circumferential surface of the sensor region 77 to cause compressive stress to remain on the outer circumferential surface of the sensor region 77 (optimizing residual compressive stress), and using the plating current density set in the range of 50 to 60 A/dm^2 to form a plated layer of the magnetostrictive film 71 on the outer circumferential surface of the sensor region 77 in which the compressive stress remains (optimizing the crystallite diameter of the plated layer). In other words, this is achieved by eliminating the need for increasing the hardness of the second steering shaft (rotary shaft) 23 to such an extent as exceeding the Rockwell hardness of 40 HRC to reduce plastic deformation of the outer circumferential surface of the sensor region 77 thereof as in Japanese Patent Application Publication No. 2004-239652.

As a result, a step of the heat treatment (carburizing treatment) is eliminated that is applied to an SCM material in Japanese Patent Application Publication No. 2004-239652, to remarkably improve the yield of the semifinished product (the second steering shaft 23). Besides, the number of manufacturing steps is reduced due to elimination of the predetermined operating time required for the heat treatment (carburizing treatment).

Still moreover, a method of manufacturing a magnetostrictive torque sensor according to a seventh aspect of the present invention is the method of manufacturing a magnetostrictive torque sensor according to any one of the third to fifth aspects of the present invention, wherein the second steering shaft (rotary shaft) 23 may be made of a non-magnetic material. Aluminum may be used as the non-magnetic material, for example, for manufacturing the second steering shaft 23.

According to the method of manufacturing a magnetostrictive torque sensor according to the seventh aspect of the present invention, the second steering shaft 23 is made of a non-magnetic material so that there is no error induced in detecting the steering torque due to a change in a magnetic property (magnetic permeability). In addition, adopting aluminum as a workpiece, for example, allows for significantly reducing the manufacturing cost, because aluminum is an inexpensive general-purpose material.

Other Embodiments

The embodiments described hereinabove are merely examples of embodying the present invention. Therefore, the technical scope of the present invention should not be interpreted as being limited to these. This is because the present invention can be implemented in various forms without departing from the spirit or main characteristics thereof.

For example, a description has been given in the embodiment of the present invention of the magnetostrictive torque sensor according to the present invention by way of an example of using it as a steering torque sensor of the electric power steering apparatus, but the present invention is not limited to the example. The magnetostrictive torque sensor according to the present invention can be applied to any application for contactlessly detecting a rotational torque about the axis acting on a rotary shaft.

The invention claimed is:

1. A magnetostrictive torque sensor comprising:
   a magnetostrictive film that is arranged on a rotary shaft having a substantially columnar shape so as to surround the rotary shaft around an axis of the rotary shaft, for detecting a rotational torque about the axis acting on the rotary shaft based on a change in a magnetic property of the magnetostrictive film,
   wherein an outer circumferential surface of a sensor region of the rotary shaft has residual compressive stress, and the magnetostrictive film is arranged around the sensor region of the rotary shaft, and
   a plated layer of the magnetostrictive film is arranged on the outer circumferential surface of the sensor region which has the residual compressive stress.

2. An electric power steering apparatus comprising:
   the magnetostrictive torque sensor according to claim 1, wherein the magnetostrictive torque sensor detects a steering torque of a steering member of a vehicle acting on the rotary shaft; and
   an auxiliary motor that generates an auxiliary torque corresponding to the steering torque detected by the magnetostrictive torque sensor,
   wherein the electric power steering apparatus uses the magnetostrictive torque sensor to control driving of the auxiliary motor.

3. The magnetostrictive torque sensor according to claim 1, wherein the outer circumferential surface of only the sensor region of the rotary shaft has residual compressive stress.

4. The magnetostrictive torque sensor according to claim 3, wherein the outer circumferential surface of the sensor region of the rotary shaft is recessed relative to the outer circumferential surface of other regions of the rotary shaft as a result of the polishing.

5. The magnetostrictive torque sensor according to claim 1, wherein the outer circumferential surface of the sensor region of the rotary shaft is polished to cause the residual compressive stress therein.

6. The magnetostrictive torque sensor according to claim 5, wherein the outer circumferential surface of the sensor region of the rotary shaft is recessed relative to the outer circumferential surface of other regions of the rotary shaft as a result of the polishing.

7. The magnetostrictive torque sensor according to claim 1, wherein the outer circumferential surface of only the sensor region of the rotary shaft is polished to cause the residual compressive stress therein so that the outer circumferential surface of only the sensor region of the rotary shaft has residual compressive stress.

8. The magnetostrictive torque sensor according to claim 1, wherein the outer circumferential surface of the sensor region of the rotary shaft is recessed relative to the outer circumferential surface of other regions of the rotary shaft.

9. A method of manufacturing a magnetostrictive torque sensor, wherein the sensor includes a magnetostrictive film that is arranged on a rotary shaft having a substantially columnar shape so as to surround the rotary shaft around an axis of the rotary shaft, for detecting a rotational torque about the axis acting on the rotary shaft based on a change in a magnetic property of the magnetostrictive film, the method comprising a step of using a plating current density set in a range of 50 to 60 A/dm^2 to form a plated layer of the magnetostrictive film.

10. The method of manufacturing a magnetostrictive torque sensor according to claim 9, wherein the rotary shaft has the Rockwell hardness of 40 HRC or less.

11. The method of manufacturing a magnetostrictive torque sensor according to claim 10, wherein the rotary shaft is made of a carbon steel material for machine structural use.

12. The method of manufacturing a magnetostrictive torque sensor according to claim 10, wherein the rotary shaft is made of a non-magnetic material.

13. The method of manufacturing a magnetostrictive torque sensor according to claim 9, wherein the rotary shaft is made of a carbon steel material for machine structural use.

14. The method of manufacturing a magnetostrictive torque sensor according to claim 9, wherein the rotary shaft is made of a non-magnetic material.

15. A method of manufacturing a magnetostrictive torque sensor, wherein the sensor includes a magnetostrictive film that is arranged on a rotary shaft having a substantially columnar shape so as to surround the rotary shaft around an axis of the rotary shaft, for detecting a rotational torque about the axis acting on the rotary shaft based on a change in a magnetic property of the magnetostrictive film, the method comprising steps of causing compressive stress to remain on the outer circumferential surface of a sensor region of the rotary shaft, on which a magnetostrictive film is arranged; and using a plating current density set in a range of 50 to 60 A/dm^2 to form a plated layer of the magnetostrictive film on the outer circumferential surface of the sensor region in which the compressive stress remains.

16. The method of manufacturing a magnetostrictive torque sensor according to claim 15, wherein the rotary shaft has the Rockwell hardness of 40 HRC or less.

17. The method of manufacturing a magnetostrictive torque sensor according to claim 16, wherein the rotary shaft is made of a carbon steel material for machine structural use.

18. The method of manufacturing a magnetostrictive torque sensor according to claim 16, wherein the rotary shaft is made of a non-magnetic material.

19. The method of manufacturing a magnetostrictive torque sensor according to claim 15, wherein the rotary shaft is made of a carbon steel material for machine structural use.

20. The method of manufacturing a magnetostrictive torque sensor according to claim 15, wherein the rotary shaft is made of a non-magnetic material.

\* \* \* \* \*